(12) United States Patent
He et al.

(10) Patent No.: US 12,317,251 B2
(45) Date of Patent: May 27, 2025

(54) SUPER-SLOT BASED DATA TRANSMISSION IN WIRELESS COMMUNICATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

(*) Notice: Subject to any disclaimer, the term of this patent is extended or adjusted under 35 U.S.C. 154(b) by 283 days.

(21) Appl. No.: 17/593,458

(22) PCT Filed: Sep. 18, 2020

(86) PCT No.: PCT/CN2020/116189
§ 371 (c)(1),
(2) Date: Sep. 19, 2021

(87) PCT Pub. No.: WO2022/056835
PCT Pub. Date: Mar. 24, 2022

(65) Prior Publication Data
US 2022/0304013 A1     Sep. 22, 2022

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1812* (2013.01); *H04L 5/0051* (2013.01);
(Continued)

(58) Field of Classification Search
CPC ......... H04W 72/1263; H04W 72/0446; H04W 72/23; H04L 1/1812; H04L 5/0051; H04L 5/0055
See application file for complete search history.

(56) References Cited

U.S. PATENT DOCUMENTS 10,432,368 B1    10/2019 Pawar et al.
11,277,883 B2 *   3/2022 Talarico ............... H04L 1/1887
(Continued)

FOREIGN PATENT DOCUMENTS

CN    105827374    8/2016
CN    110268665    9/2019
(Continued)

OTHER PUBLICATIONS

Nokia et al., "On the open aspects of HARQ management"; 3GPP TSG RAN WG1 NR Ad-Hoc #3; R1-1715546; Sep. 21, 2017; 9 sheets.
(Continued)

*Primary Examiner* — Redentor Pasia
(74) *Attorney, Agent, or Firm* — Fay Kaplun & Marcin, LLP

(57) ABSTRACT

A user equipment (UE) receives a resource allocation for a shared channel transmission that includes mapping modulated symbols of a transport block with a single dedicated hybrid automatic repeat request (HARQ) process number across resource elements for N consecutive slots of the resource allocation, wherein N is at least two. The UE may also receive, from a base station, a demodulation reference signal (DMRS) triggering (DMRS-T) value indicating a
(Continued)

DMRS pattern to be used for a physical downlink shared channel (PDSCH) transmission, wherein the PDSCH transmission includes mapping modulated symbols of a transport block with a single dedicated hybrid automatic repeat request (HARQ) process number across resource elements for N consecutive slots of a PDSCH resource allocation, wherein N is at least two and measure transmitted DMRS based on the DMRS pattern corresponding to the DMRS-T value.

12 Claims, 8 Drawing Sheets

(51) Int. Cl.
  *H04L 5/00* (2006.01)
  *H04W 72/0446* (2023.01)
  *H04W 72/23* (2023.01)
(52) U.S. Cl.
  CPC ....... *H04L 5/0055* (2013.01); *H04W 72/0446* (2013.01); *H04W 72/23* (2023.01)

(56) References Cited

U.S. PATENT DOCUMENTS

| | | | | |
|---|---|---|---|---|
| 11,350,436 | B2* | 5/2022 | Xu | H04L 5/0094 |
| 11,405,936 | B2* | 8/2022 | Wang | H04L 5/0091 |
| 11,496,344 | B2* | 11/2022 | Takeda | H04L 5/001 |
| 2019/0044663 | A1 | 2/2019 | Rosa et al. | |
| 2019/0149365 | A1* | 5/2019 | Chatterjee | H04L 25/0226 370/329 |
| 2019/0150122 | A1* | 5/2019 | Ying | H04W 72/23 370/329 |
| 2019/0222380 | A1* | 7/2019 | Manolakos | H04L 25/0224 |
| 2019/0230691 | A1* | 7/2019 | Cao | H04L 5/0044 |
| 2019/0327755 | A1 | 10/2019 | Xiong et al. | |
| 2020/0045706 | A1 | 2/2020 | Shin et al. | |
| 2020/0235891 | A1* | 7/2020 | Lei | H04L 1/1864 |
| 2020/0314817 | A1* | 10/2020 | Sun | H04L 5/0044 |
| 2021/0160829 | A1 | 5/2021 | Park | |
| 2021/0297186 | A1* | 9/2021 | Amuru | H04L 1/1812 |
| 2021/0314100 | A1 | 10/2021 | Yeo et al. | |
| 2021/0320760 | A1* | 10/2021 | Rastegardoost | H04L 1/0028 |
| 2021/0352527 | A1* | 11/2021 | Sridharan | H04L 1/08 |
| 2022/0224455 | A1* | 7/2022 | Falahati | H04L 5/0092 |
| 2022/0304013 | A1* | 9/2022 | He | H04L 5/0055 |
| 2022/0361231 | A1* | 11/2022 | Oh | H04W 72/1268 |
| 2023/0007637 | A1* | 1/2023 | Park | H04L 5/0091 |
| 2023/0291523 | A1* | 9/2023 | Hasegawa | H04L 5/0094 |

FOREIGN PATENT DOCUMENTS

| | | |
|---|---|---|
| CN | 110301110 | 10/2019 |
| CN | 110419186 | 11/2019 |
| CN | 110447281 | 11/2019 |
| CN | 110999165 | 4/2020 |
| CN | 111279767 | 6/2020 |
| EP | 3846570 | 7/2021 |
| WO | 2004/038990 | 5/2004 |
| WO | 2015/148045 | 10/2015 |
| WO | 2018/175820 | 9/2018 |
| WO | 2019/033389 | 2/2019 |
| WO | 2020/067821 | 4/2020 |
| WO | 2020/098509 | 5/2020 |
| WO | 2020/146854 | 7/2020 |
| WO | 2020/165997 | 8/2020 |

OTHER PUBLICATIONS

Samsung, "NR-PDCCH Design for URLLC"; 3GPP TSG RAN WG1 Meeting #88bis, R1-1705383, Apr. 2, 2017, 7 sheets.

* cited by examiner

| Value of DMRS-T field | Description |
|---|---|
| '00' | No DMRS is transmitted for the data associated with the scheduling DCI |
| '01' | A first DMRS pattern configured by higher layers is used |
| '10' | A second DMRS pattern configured by higher layers is used |
| '11' | A third DMRS pattern configured by higher layers is used |
Fig. 7
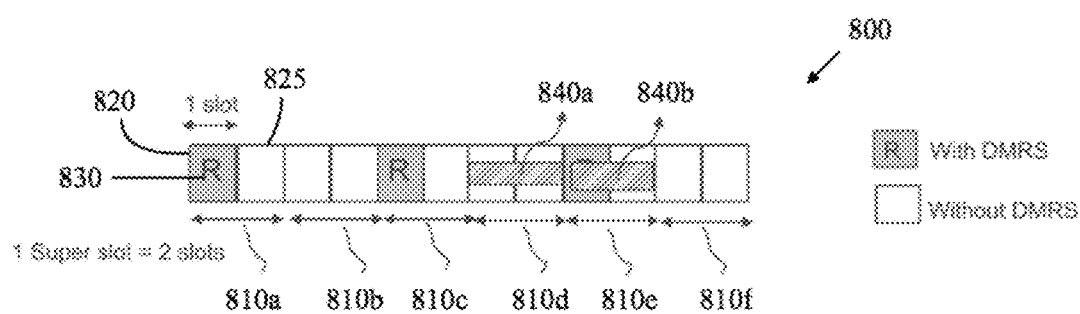
Fig. 8
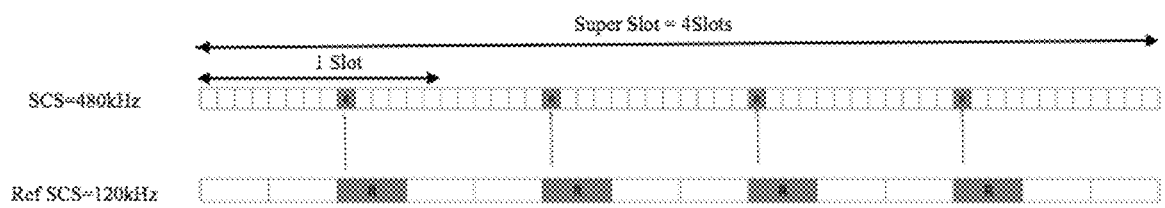
Fig. 9

SUPER-SLOT BASED DATA TRANSMISSION IN WIRELESS COMMUNICATION

BACKGROUND INFORMATION

A user equipment (UE) may be configured to establish a connection with a network. In one example, the UE may connect to a 5G New Radio (NR) network. NR specifications have been developed in Rel-15 and Rel-16 defining operations for frequencies up to 52.6 GHz, where all physical layer channels, signals, procedures, and protocols are designed to be optimized for uses under 52.6 GHz. Specifications defining operations for frequencies over 52.6 GHz are in development, however, various challenges arise when using these higher frequencies relative to those under 52.6 GHz. For example, higher frequencies experience higher phase noise, larger propagation loss due to high atmospheric absorption, and lower power amplifier efficiency.

To mitigate the problem of higher phase noise, the largest subcarrier spacing (SCS) may be increased. However, a larger SCS causes longer round trip times for hybrid automatic repeat request (HARQ) processes and increases the downlink control information (DCI) signaling overhead, as the HARQ processes number is signaled in the scheduling DCI format. In addition, the UE complexity for HARQ processes management is increased.

SUMMARY

Some exemplary embodiments are related to one or more processors configured to perform operations. The operations include receiving a resource allocation for a shared channel transmission, wherein the shared channel transmission includes mapping modulated symbols of a transport block with a single dedicated hybrid automatic repeat request (HARQ) process number across resource elements for N consecutive slots of the resource allocation, wherein N is at least two.

Other exemplary embodiments are related to a user equipment (UE) having a transceiver configured to connect to a base station and one or more processors configured to perform operations. The operations include receiving a resource allocation for a shared channel transmission between the UE and the base station, wherein the shared channel transmission includes mapping modulated symbols of a transport block with a single dedicated hybrid automatic repeat request (HARQ) process number across resource elements for N consecutive slots of the resource allocation, wherein N is at least two.

Still further exemplary embodiments are related to one or more processors configured to perform operations. The operations include receiving, from a base station, a demodulation reference signal (DMRS) triggering (DMRS-T) value indicating a DMRS pattern to be used for a physical downlink shared channel (PDSCH) transmission, wherein the PDSCH transmission includes mapping modulated symbols of a transport block with a single dedicated hybrid automatic repeat request (HARQ) process number across resource elements for N consecutive slots of a PDSCH resource allocation, wherein N is at least two and measuring transmitted DMRS based on the DMRS pattern corresponding to the DMRS-T value.

BRIEF DESCRIPTION OF THE DRAWINGS

FIG. 7 shows a table providing an exemplary dynamic DMRS pattern indication according to various exemplary embodiments.

FIG. 8 shows an exemplary DMRS pattern for S-slot based PDSCH transmission according to various exemplary embodiments.

FIG. 9 shows an exemplary DMRS positioning configuration for S-slot based PDSCH transmissions according to various exemplary embodiments.

DETAILED DESCRIPTION

Figure 1:
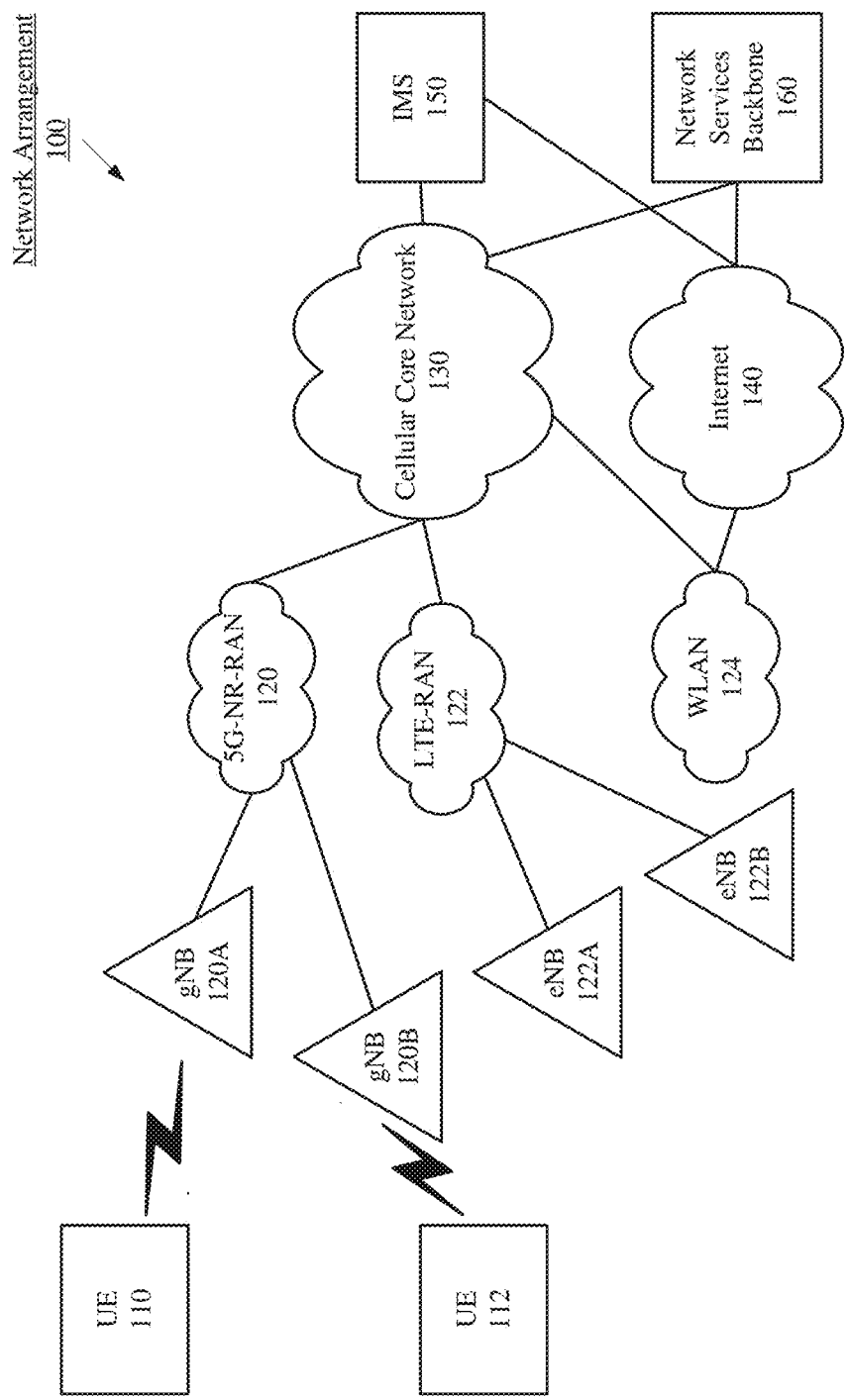
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a super slot (S-slot) based time domain resource allocation (TDRA) scheme for transmit/receive operations between a user equipment (UE) and a next generation nodeB (gNB). An S-Slot may include two or more consecutive slots for which a single dedicated hybrid automatic repeat request (HARQ) process number is assigned. The modulated symbols of a physical downlink shared channel (PDSCH) or a physical uplink shared channel (PUSCH) transmission, e.g., one transport block with a dedicated HARQ process number, may be mapped in sequence to all of the resource elements (REs) included across the aggregated S-slot.

The exemplary embodiments described herein relate to S-slot mapping, signaling details for the S-slot-based TDRA scheme and demodulation reference symbol (DMRS) patterns for S-slot-based scheduling.

Network/Devices

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B. The UE 110 connection to the gNB 120A, according to certain exemplary embodiments, may be over a frequency greater than 52.6 GHz.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
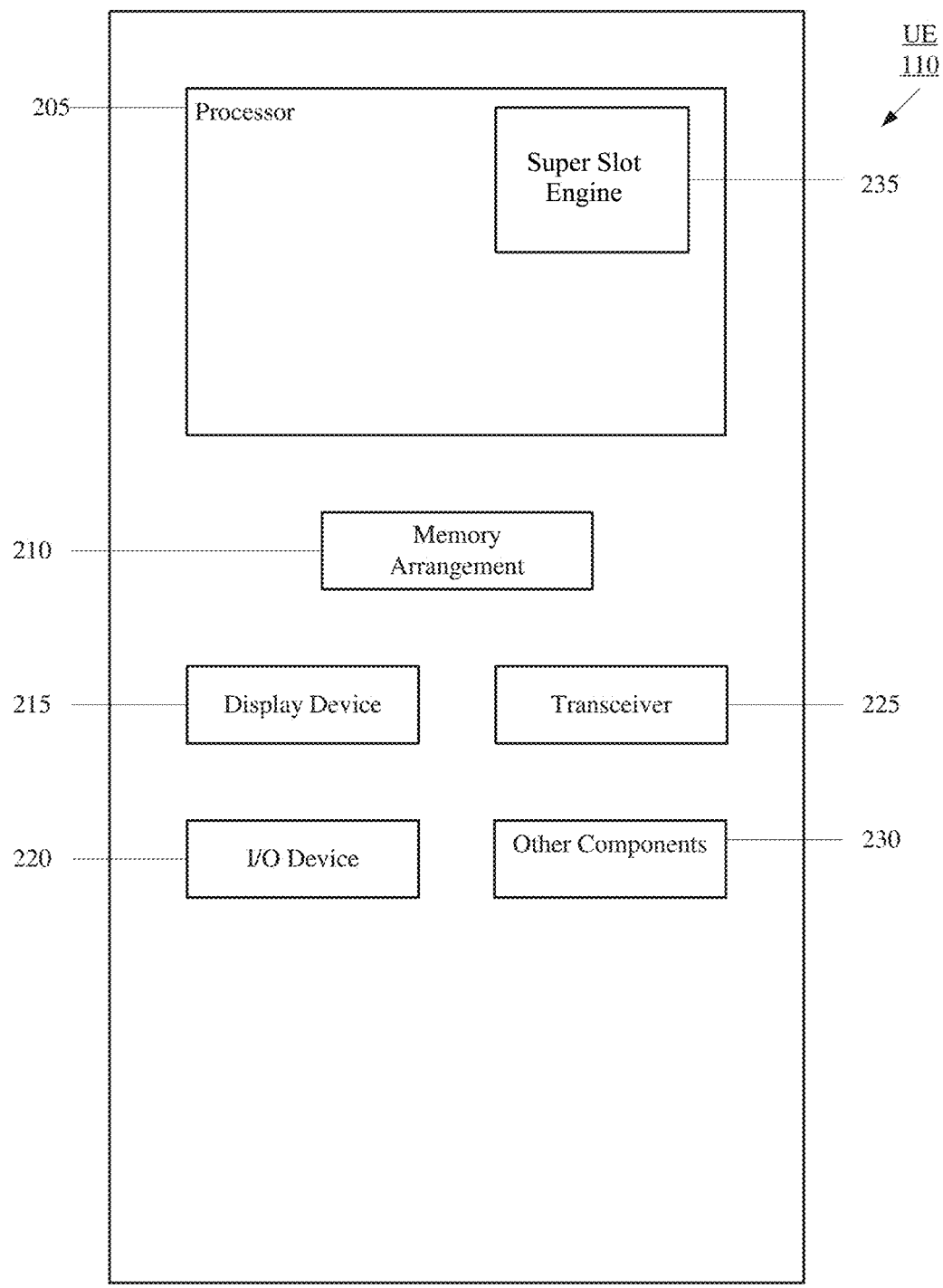
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a super slot (S-slot) engine 235 for performing operations including transmit/receive operations for transport blocks using multiple consecutive aggregated slots. The S-slot engine 235 may perform operations such as determining an S-slot configuration for a data transmission, to be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g. NR-U is configured.

Figure 3:
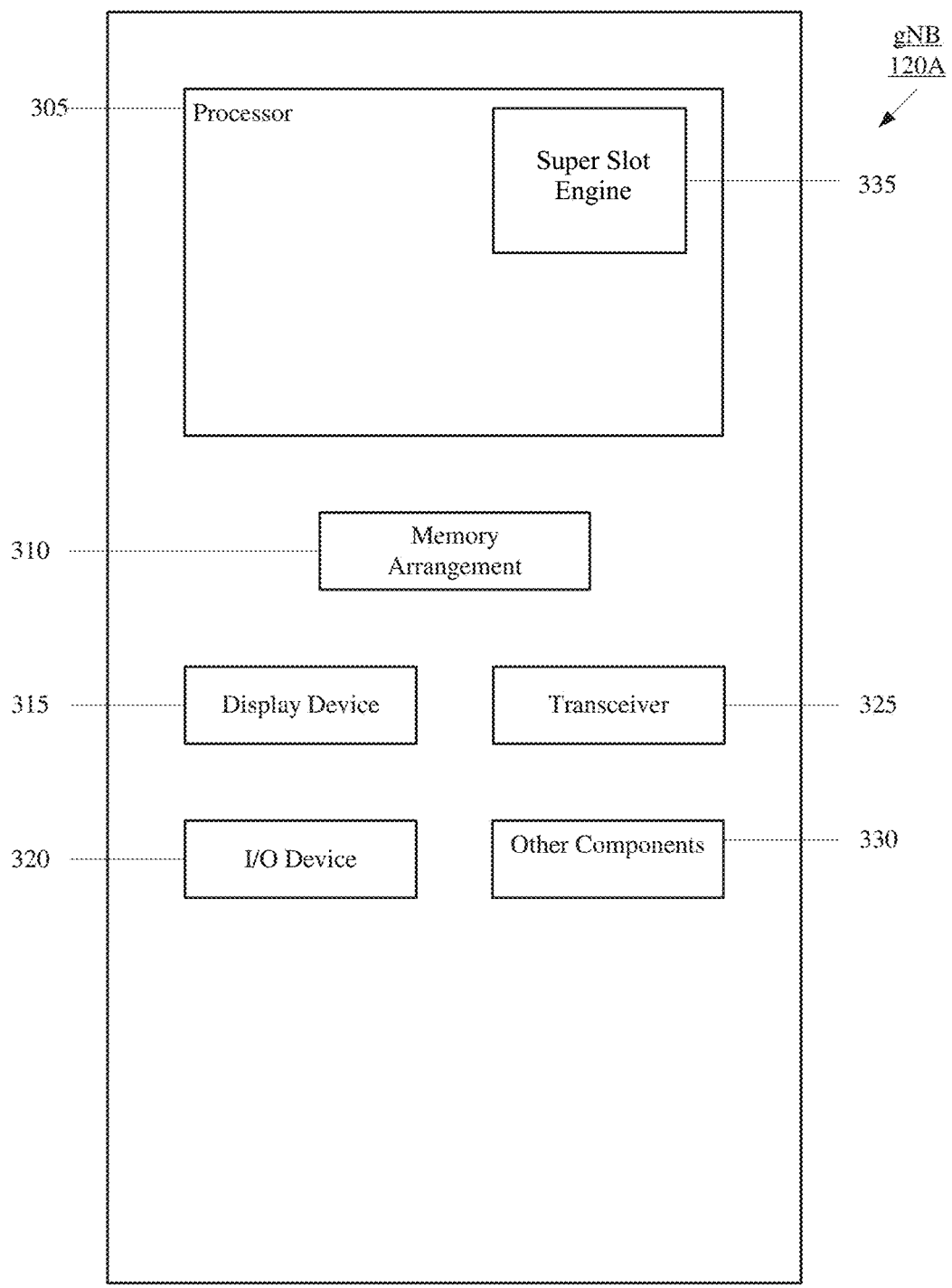
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a super slot (S-slot) engine 235 for performing operations including configuring an S-slot for a data transmission, to be described in detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). For example, the transceiver 325 may operate on unlicensed bandwidths when NR-U functionality is configured. Therefore, the transceiver 325 may include one or more components (e.g., radios) to enable the data exchange with the various networks and UEs.

Super Slot-Based TDRA

NR specifications have been developed in Rel-15 and Rel-16 defining operations for frequencies up to 52.6 GHz, where all physical layer channels, signals, procedures, and protocols are designed to be optimized for uses under 52.6 GHz. To exploit the radio spectrum above the 52.6 GHz frequency regime to operate in the NR system, a Rel-17 study item "Study on supporting NR from 52.6 GHz to 71 GHz" was approved in RAN plenary #86 meeting. However, frequencies above 52.6 GHz are faced with more difficult challenges, such as higher phase noise, larger propagation loss due to high atmospheric absorption, and lower power amplifier efficiency. More specifically, to mitigate the problem of higher phase noise, the largest subcarrier spacing (SCS) (i.e., the width of the subcarriers in the frequency domain) may be increased to 480 KHz or even higher (e.g. 960 KHz). However, the data processing time and HARQ-ACK feedback timing for these higher-frequency operations may not be linearly scaled down for the higher SCSs (e.g. 480/960 KHz) relative to legacy SCSs specified for the lower-frequency NR system operations.

A hybrid automatic repeat request (HARQ) operation includes an acknowledgment/negative-acknowledgement (ACK/NACK) mechanism for indicating whether a transmitted packet was successfully received or should be re-transmitted. In the NR system a Stop And Wait (SAW) process is used for HARQ operations, which relies upon the HARQ-ACK information from the receiver before proceeding to transfer any further data. The round trip time for the SAW process includes both transmitter and receiver data processing times, as well as propagation delays. More specifically, multiple parallel SAW processes, e.g., HARQ processes, are used to avoid the round trip time having an impact on the throughput performance. For example, up to 16 parallel HARQ processes may occur simultaneously for one transmitter/receiver pair. Longer round trip times for a larger SCS (e.g. 480/960 KHz) may result in an increased number of parallel HARQ processes, which can also cause a high DCI signaling overhead as the HARQ processes number is signaled in the scheduling DCI format. In addition, the UE complexity for HARQ processes management is increased. There is a clear need to address these problems without throughput degradation.

According to certain aspects of this disclosure, a super-slot (S-slot) based time domain resource allocation (TDRA) scheme is used for transmit/receive operations between a user equipment (UE) and a next generation nodeB (gNB). An S-Slot may be composed of two or more consecutive slots in the time domain for which a single dedicated hybrid automatic repeat request (HARQ) process number is assigned. The modulated symbols of a physical downlink shared channel (PDSCH) or a physical uplink shared channel (PUSCH) transmission, e.g., one transport block with a dedicated HARQ process number, may be mapped in sequence to all of the resource elements (REs) across the S-slot. The sequenced RE mapping may be in increasing order, first in the frequency domain and then in the time domain, or first in the time domain and then in the frequency domain.

Figure 4:
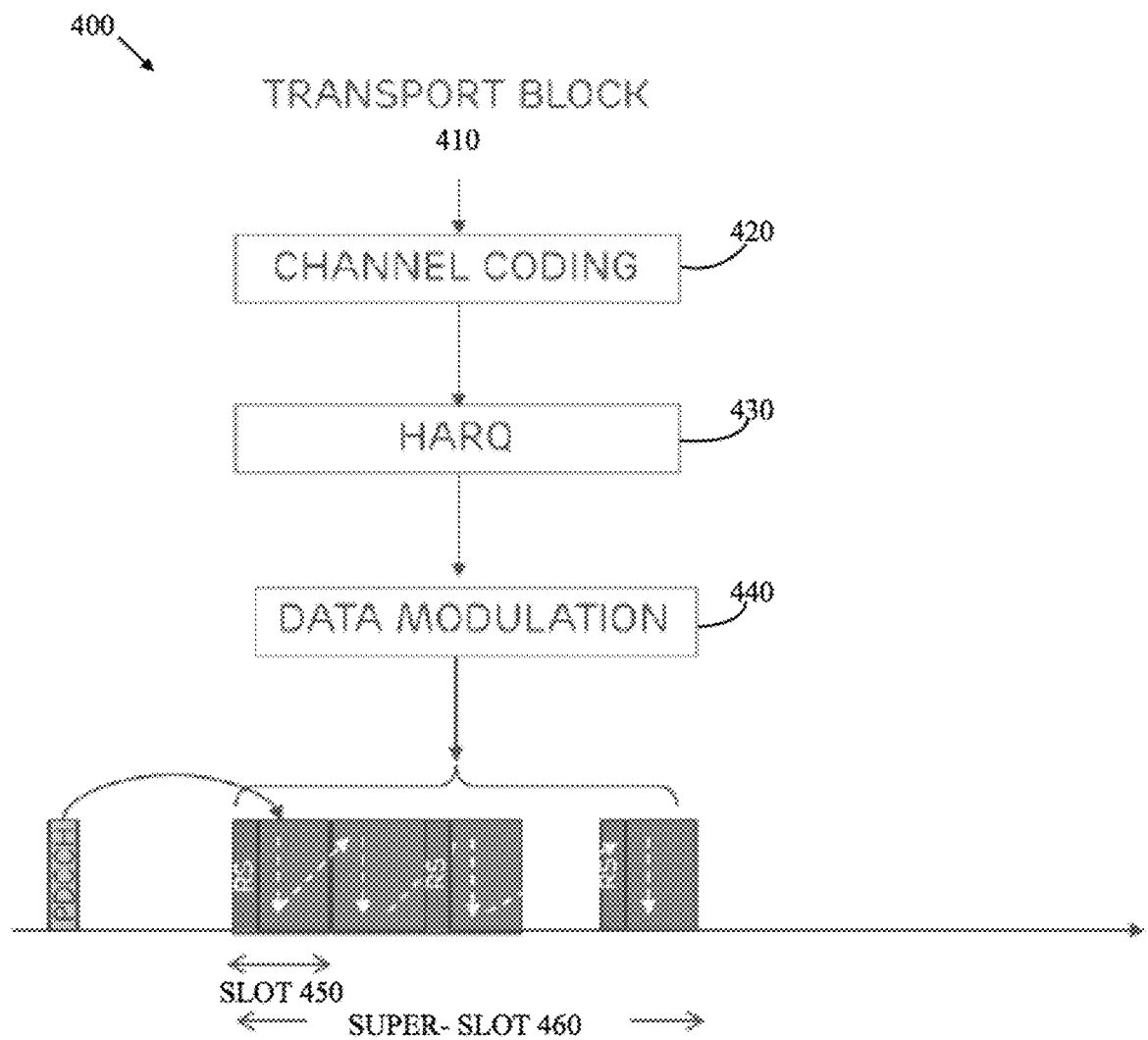
FIG. 4 shows an exemplary transport block mapping scheme utilizing a super slot (S-slot) according to various exemplary embodiments.

FIG. 4 shows an exemplary transport block mapping scheme 400 utilizing a super slot (S-slot) 460 according to various exemplary embodiments. A transport block 410 undergoes channel coding 420, HARQ processing 430 (e.g. including a dedicated HARQ process number) and data modulation 440 to generate modulated symbols for a PDSCH/PUSCH transmission. The modulated symbols are then mapped in sequence to the N slots 450 of the S-slot 460. In the example of FIG. 4, the mapping is performed in increasing order of first in frequency and then in time as shown by the dashed lines in the slots 450.

Signaling Details

A variety of approaches may be used to indicate an S-slot within a window for data transmission.

In a first approach, when a UE is scheduled with a PDSCH/PUSCH by a downlink control information (DCI) transmission from a gNB, the time domain resource assignment (TDRA) field value of the DCI provides a row index to an allocation table. Each index value corresponds to parameters for a starting slot (e.g., slot offset field) and start and length indicator value (SLIV) for each of the N slots of the super slot, wherein N≥2. The slot offset value and SLIV may be configured for the UE via higher layer signaling, e.g. RRC signaling.

Figure 5:
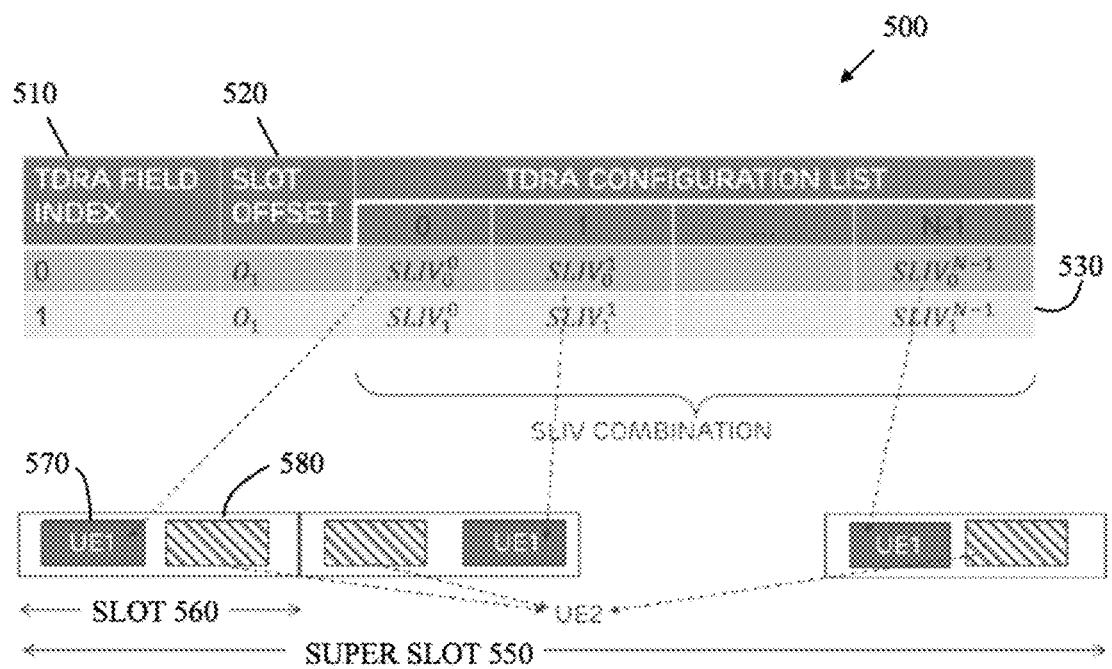
FIG. 5 shows an exemplary super slot (S-slot) based TDRA table for PDSCH/PUSCH scheduling over the S-slot according to various exemplary embodiments.

FIG. 5 shows an exemplary super slot (S-slot) based TDRA table 500 for PDSCH/PUSCH scheduling over the S-slot 550 according to various exemplary embodiments. Each TDRA field index value 510 indicates a slot offset 520 and N SLIVs 530 for each of the N slots 560 of the S-slot, wherein N≥2. That is, each indicator (SLIV) combination may include multiple SLIVs 530 in consecutive slots 560 within the S-Slot 550. The starting slot 560 of the S-slot 550 is signaled by the slot offset field 520 relative to the PDCCH/PUCCH slot. As illustrated in FIG. 4, one S-Slot of up to N slots may be used for resource allocation for a single transport block (TB) transmission. More than one UE may be scheduled in a slot 560 of S-Slot 550 in a time domain multiplexing (TDM) manner to improve resource efficiency, as shown by, for example, portion 570 of slot 560 for a first UE configuration and portion 580 of slot 560 for a second UE configuration. It is noted that the size of each S-Slot may be the same or different.

Figure 6:
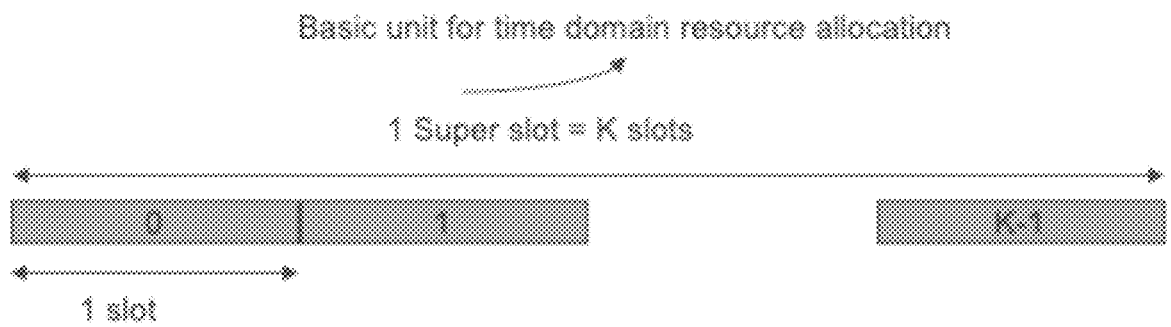
FIG. 6 shows an exemplary super slot (S-slot) including K slots according to various exemplary embodiments.

In a second approach, a super slot (S-slot) resource grid may be introduced for resource allocation and RE mapping for PDSCH/PUSCH transmissions between a UE and a gNB. Each S-slot grid is described with $N_{RB}N_{SC}^{RB}$ subcarriers and $K*N_{symb}^{DL}$ OFDM symbols, where $N_{RB}$ represents the number of PRBs, $N_{SC}^{RB}$ represent the RB size in the number of SCs, $N_{symb}^{DL}$ is the number of OFDM symbols in a slot, and K represents the number of slots within an S-slot, as shown in FIG. 6.

The value of K may be provided to the UE in different ways. In some embodiments, K may be defined by standards and may be a function of the SCS being used for the PDSCH/PUSCH transmission. In other embodiments, K may be signaled in a system information block (SIB). For example, SIB1 may be used to carry the K value. In further embodiments, K may be provided using dedicated RRC signaling on a per UE basis. For example, different K values may be configured depending on the 5QI latency requirements for the data traffic. A larger K value may be configured for a UE with latency-tolerable traffic.

According to certain aspects of this disclosure, a scaling factor may be introduced to determine the time domain resource allocation for the S-slot-based TDRA without increasing the signaling overhead relative to NR system operations specified for frequencies of 52.6 MHz and under. Different approaches may be considered to achieve this purpose.

A UE may derive the time domain resource allocation (TDRA) based on a SLIV value encoded in a scheduling DCI Format, which indicates both a starting symbol $S_0$ as well as a number of symbols L. The UE may then scale the $S_0$ and/or the number of symbols L to determine the S-slot starting position, e.g., $S_0^{sslot}=SF*S_0$, and/or the number of symbols for the S-slot, e.g., $L^{sslot}=SF*L$. In some embodiments, only the $S_0$ value is scaled, e.g., $S_0^{sslot}=SF*S_0$ and $L^{sslot}=L$. In other embodiments, only the L value is scaled, e.g., $S_0^{sslot}=S_0$ and $L^{sslot}=SF*L$. In further embodiments, both the $S_0$ value and the L value are scaled, e.g., $S_0^{sslot}=SF*S_0$ and $L^{sslot}=SF*L$.

Each of the above described embodiments of scaling the TDRA may be more or less suitable for a given transmission type. For example, the exemplary embodiment discussed above where only the L value is scaled, may be configured for a UE with ultra-reliable low latency communications (URLLC) traffic so as to provide finer granularity resource allocation in the time domain and better meet the stringent latency requirements of URLLC.

In some exemplary embodiments, the value of the scaling factor SF may be a function of the K value. For example, the scaling factor value may be equal to the size of the S-slot, e.g., SF=K. In another embodiment, the value of the scaling factor SF may be configured by dedicated RRC signaling based on, for example, the traffic type.

Figure 10:
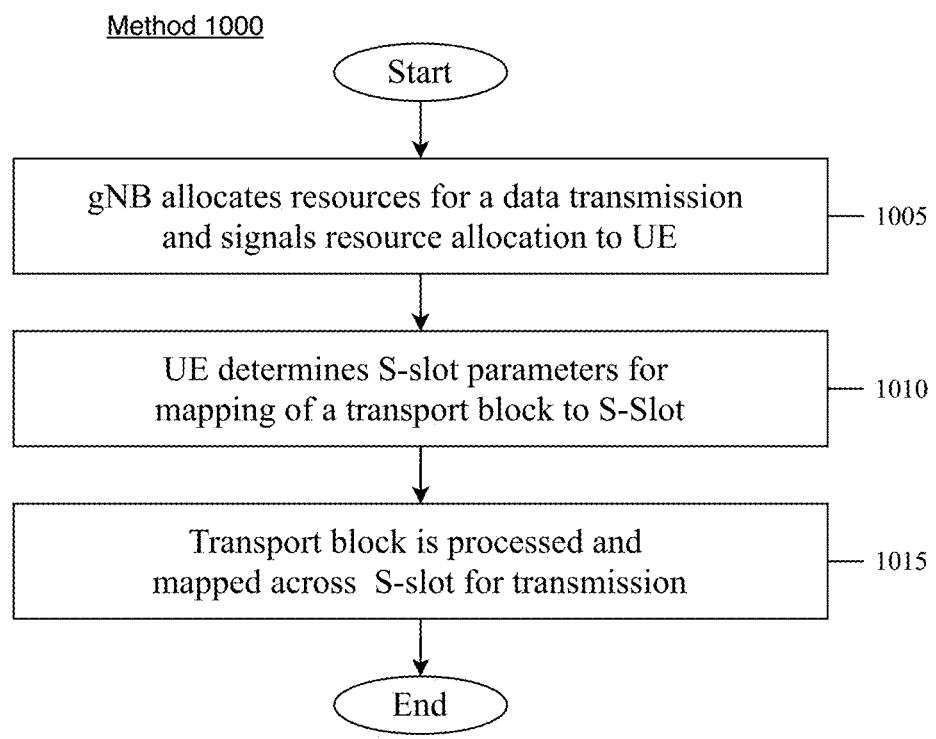
FIG. 10 shows a method for performing a super slot (S-slot) based data transmission according to various exemplary embodiments.

FIG. 10 shows a method 1000 for performing a super slot (S-slot) based data transmission according to various exemplary embodiments. The S-slot may comprise 2 or more consecutive slots in a resource allocation for a PDSCH or PUSCH transmission, wherein a single transport block (TB) is mapped to resource elements (REs) across the S-slot. The method 1000 may be particularly suitable when, for network operations between a user equipment (UE) and a next generation node B (gNB), an operating frequency is greater than 52.6 GHz and a subcarrier spacing (SCS) of 480 KHz or greater is being used, so as to reduce HARQ signaling overhead and reduce UE complexity for HARQ process management, relative to lower frequencies and lower SCSs.

In 1005, the gNB allocates resources for a data transmission and signals the resource allocation to the UE. According to the various embodiments discussed above, the resource allocation may or may not include an explicit indication of S-slot parameters. For example, in the first approach described above, the gNB includes a TDRA field value in a scheduling DCI for indicating a slot offset and a SLIV value for each of the slots of the S-slot. In the second approach described above, the gNB indicates parameters for a resource grid that may include a K value (representing the number of slots within the S-slot). In some embodiments the K value is signaled by the gNB, while in others, K is hard-encoded in the UE configuration and based on the SCS. In still other embodiments, a scaling factor (SF) is additionally signaled by the gNB to scale either one or both of a starting symbol or a number of symbols for the S-slot.

In 1010, the UE determines the S-slot parameters for the mapping of a transport block to the S-Slot. As discussed above, the mapping may be determined by an explicit indication from the gNB. In other embodiments, the UE may determine a number of slots for the S-slot and/or apply a scaling factor SF that is signaled by the gNB or hard-encoded in the UE specification.

In 1015, the transport block is processed (e.g., channel coded, HARQ processed, and data modulated in accordance with FIG. 4 discussed above) and mapped across the S-slot for transmission. For a PUSCH transmission, the UE performs the mapping and transmission of the TB while for a PDSCH transmission, the gNB performs the mapping and transmission of the TB.

DMRS Pattern for S-Slot-Based Scheduling

According to certain aspects of the present disclosure, a UE may be configured with a set of demodulation reference signal (DMRS) patterns. Each DMRS pattern has either a different DMRS symbol location and/or a different DMRS density in the time domain, relative to the other ones of the set of DMRS patterns. The gNB may then select one of the DMRS patterns based on, for example, the UE mobility status. However, the gNB may also select the DMRS pattern based on other factors. In other exemplary embodiments, the set of DMRS patterns (DMRS symbol location and/or density) may be specified by standards.

A DMRS triggering (DMRS-T) field may be included in a scheduling DCI to indicate which DMRS pattern among the set of DMRS patterns is to be used for a scheduled PDSCH transmission. The association between the value of the DMRS-T field and the DMRS pattern may be configured by higher layers.

FIG. 7 shows a table 700 providing an exemplary dynamic DMRS pattern indication according to various exemplary embodiments. In this example, the DMRS-T field in the scheduling DCI format is 2-bits, allowing for four possible values, e.g. 00, 01, 10 or 11, wherein for '00,' no DMRS is transmitted for the data associated with the scheduling DCI, and for the remaining DMRS-T values (01, 10 or 11), a first, second or third DMRS pattern is configured by higher layers. However, in other embodiments, greater or fewer numbers of bits may be used to indicate a different number of possible DMRS-T values. The DMRS may be shared across multiple consecutive S-slots to minimize the reference signal overhead. An example of a DMRS shared across consecutive S-slots will be described below with respect to FIG. 8.

FIG. 8 shows an exemplary DMRS pattern 800 for S-slot based PDSCH transmission according to various exemplary embodiments. In this example, it is assumed that the UE is in a low mobility state. In this example, six S-slots 810 are shown, e.g., S-slots 810a-f, each S-slot 810 aggregating two slots 820, 825 for data scheduling. The first slot 820 in every two S-slots 810 may contain a DMRS signal 830, and the remaining slots may be used for PDSCH transmissions 840. In this example, two PDSCH transmissions 840 are shown, e.g., a first PDSCH transmission 840a in S-slot 810d and a second PDSCH transmission 840b in S-slot 810e.

According to some exemplary embodiments, a DMRS 830 may be shared across consecutive S-slots 810, e.g., the S-slots 810d and 810e in which the PDSCH transmissions 840 are scheduled in FIG. 8. The UE may receive an indication in an earlier S-slot 810, e.g., S-slot 810d, to reuse the DMRS 830 scheduled in a later S-slot 810, e.g. the DMRS 830 in S-slot 810e, for both of the PDSCH transmissions 840 in consecutive slots 810d and 810e so as to reduce the reference signal overhead.

In other exemplary embodiments, three or more consecutive S-slots 810 having PDSCH transmissions 840 may share a DMRS. For example, if there was an additional PDSCH 840 scheduled in S-Slot 810c, the UE may receive an indication to reuse the DMRS from S-Slot 810e for the PDSCH in S-slot 810c, to further minimize the PDSCH decoding latency. It is noted that the DMRS 830 may be sent in S-slot 810e even if the UE or gNB decides to skip the associated PDSCH/PUSCH transmission (e.g. PDSCH 840b scheduled in S-Slot 810e) so as to facilitate the decoding operation for the earlier PDSCH/PUSCH, e.g., PDSCH 840a.

A variety of approaches may be considered for DMRS position l in an S-Slot data transmission. In a first approach, the UE may be configured with a reference subcarrier spacing (SCS) for DMRS position determination. The UE may determine the position of the DMRS symbol based on the data mapping type and duration corresponding to the reference SCS. For example, the DMRS may be transmitted in the first symbol that is overlapped with the DMRS location based on the reference SCS.

In some exemplary embodiments, to avoid impacts on the decoding latency, the first DMRS location, e.g., l=0 may be based on the SCS of the PDSCH/PUSCH transmission while, depending on the duration of the data transmission, the other DMRS locations (if present) may be determined based on the reference SCS.

FIG. 9 shows an exemplary DMRS positioning configuration 900 for S-slot based PDSCH transmissions according to various exemplary embodiments. The example of FIG. 9 assumes a reference SCS of 120 KHz, with the SCS of the serving cell being 480 KHz. As shown in FIG. 9, the UE may determine the DMRS location based on the reference SCS, e.g., 120 KHz to avoid unnecessary RS overhead.

In a second approach the DMRS pattern may be defined on a per S-Slot basis by distributing the possible locations across the whole S-Slot. In other words, any pattern may be used that distributes the DMRS over the entire S-slot.

Figure 11:
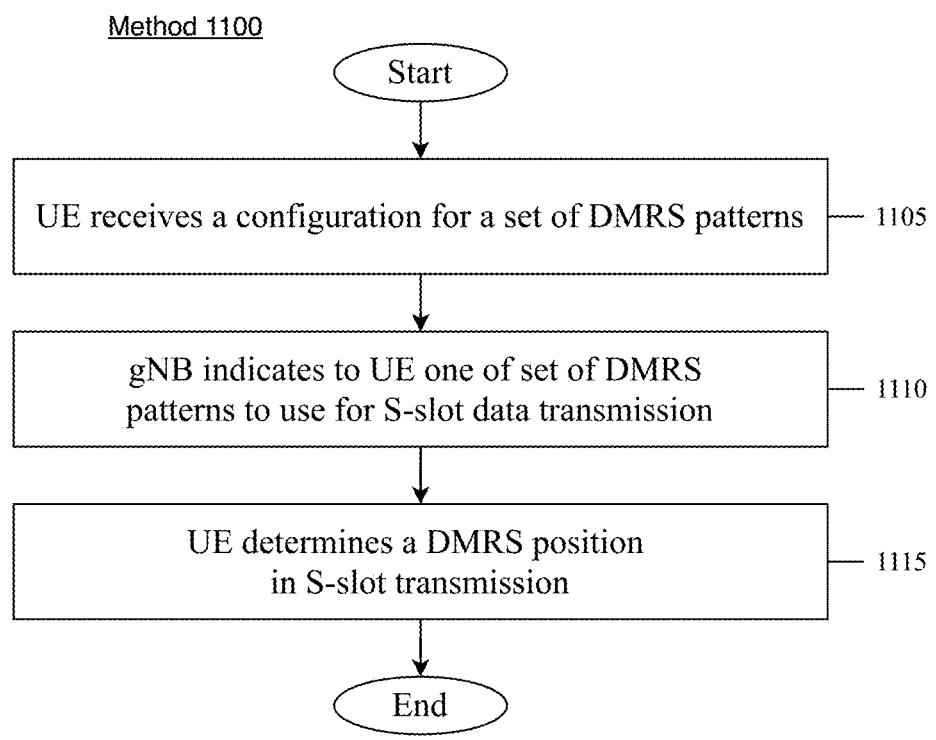
FIG. 11 shows a method for determining a DMRS pattern for an S-slot data transmission according to various exemplary embodiments.

FIG. 11 shows a method 1100 for determining a DMRS pattern for an S-slot data transmission according to various exemplary embodiments. In 1105, a UE receives a configuration for a set of DMRS patterns. The DMRS patterns may be hard-encoded or signaled by a gNB.

In 1110, the gNB indicates to the UE one of the set of DMRS patterns to use for the S-slot data transmission. The indication may be a DMRS-T field value included in a DCI transmission.

In 1115, the UE determines a DMRS position in the S-slot transmission. For example, a reference SCS (e.g. 120 KHz) may be used and expanded to the SCS being used by the gNB (e.g. 480 KHz).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. An apparatus comprising processing circuitry configured to:
receive a resource allocation for a physical downlink shared channel (PDSCH) transmission, wherein the PDSCH transmission includes mapping modulated symbols of a transport block with a single dedicated hybrid automatic repeat request (HARQ) process number across resource elements for N consecutive slots of the resource allocation, wherein N is at least two; and
receive a downlink control information (DCI) scheduling the PDSCH, the DCI including a time domain resource allocation (TDRA) value corresponding to the N consecutive slots of the resource allocation for the PDSCH, wherein the TDRA value provides a row index of an allocation table, the row index corresponding to a slot offset and multiple start and length indicator values (SLIVs) for the PDSCH.

2. The apparatus of claim 1, wherein the processing circuitry is further configured to:
receive the PDSCH transmission from a base station; and
decode the PDSCH transmission based on an indicated configuration of the N consecutive slots.

3. The apparatus of claim 1, wherein the modulated symbols are mapped sequentially to the resource elements in increasing order of i) first in frequency and then in time or ii) first in time and then in frequency.

4. The apparatus of claim 1, wherein the processing circuitry is further configured to:
determine a value of N to be used for the PDSCH transmission, wherein N is any one of i) determined as a function of a subcarrier spacing for the resource allocation, ii) signaled to the UE in a system information block, or iii) signaled to a user equipment (UE) using dedicated radio resource control (RRC) signaling.

5. The apparatus of claim 1, wherein the resource allocation includes a time domain resource allocation (TDRA) value indicating a starting symbol S_0 and a number of symbols L, wherein either one or both of the starting symbol S_0 or the number of symbols L is scaled by a scaling factor.

6. The apparatus of claim 5, wherein a value of the scaling factor is determined as a function of N or configured by a base station via higher layer signaling and based on a traffic type for the shared channel transmission.

7. The apparatus of claim 6, wherein, for ultra-reliable low latency communications (URLLC) traffic, the number of symbols L is scaled by the scaling factor and the starting symbol S_0 is not scaled by the scaling factor.

8. A user equipment (UE), comprising:
a transceiver configured to connect to a base station; and
one or more processors configured to perform operations comprising:
receiving a resource allocation for a physical downlink shared channel (PDSCH) transmission between the UE and the base station, wherein the PDSCH transmission includes mapping modulated symbols of a transport block with a single dedicated hybrid automatic repeat request (HARQ) process number across resource elements for N consecutive slots of the resource allocation, wherein N is at least two; and
receiving downlink control information (DCI) scheduling the PDSCH, the DCI including a time domain resource allocation (TDRA) value corresponding to the N consecutive slots of the resource allocation for the PDSCH, wherein the TDRA value provides a row index of an allocation table, the row index corresponding to a slot offset and multiple start and length indicator values (SLIVs) for the PDSCH.

9. The UE of claim 8, wherein the operations further comprise:
receiving the PDSCH transmission from a next generation base station (gNB); and
decoding the PDSCH transmission based on an indicated configuration of the N consecutive slots.

10. The UE of claim 8, wherein the modulated symbols are mapped sequentially to the resource elements in increasing order of i) first in frequency and then in time or ii) first in time and then in frequency.

11. A method performed by a user equipment (UE), comprising:
receiving a resource allocation for a physical downlink shared channel (PDSCH) transmission, wherein the PDSCH transmission includes mapping modulated symbols of a transport block with a single dedicated hybrid automatic repeat request (HARQ) process number across resource elements for N consecutive slots of the resource allocation, wherein N is at least two; and
receiving a downlink control information (DCI) scheduling the PDSCH, the DCI including a time domain resource allocation (TDRA) value corresponding to the N consecutive slots of the resource allocation for the PDSCH, wherein the TDRA value provides a row index of an allocation table, the row index corresponding to a slot offset and multiple start and length indicator values (SLIVs) for the PDSCH.

12. The method of claim 11, wherein the operations further comprise:
receiving the PDSCH transmission from a base station; and
decoding the PDSCH transmission based on an indicated configuration of the N consecutive slots.

* * * * *